(12) United States Patent
Schonlau et al.

(10) Patent No.: US 8,500,222 B2
(45) Date of Patent: Aug. 6, 2013

(54) ACTUATING UNIT FOR A MOTOR VEHICLE BRAKE SYSTEM

(75) Inventors: Jürgen Schonlau, Walluf (DE);
Manfred Rüffer, Sulzbach (DE);
Holger von Hayn, Bad Vilbel (DE);
Thomas Sellinger, Offenbach (DE);
Lazar Milisic, Kelkheim (DE)

(73) Assignee: Continental Teves AG & Co. oHG (DE)

( * ) Notice: Subject to any disclaimer, the term of this patent is extended or adjusted under 35 U.S.C. 154(b) by 421 days.

(21) Appl. No.: 12/527,732

(22) PCT Filed: May 24, 2007

(86) PCT No.: PCT/EP2007/055046
§ 371 (c)(1),
(2), (4) Date: Feb. 1, 2010

(87) PCT Pub. No.: WO2008/107023
PCT Pub. Date: Sep. 12, 2008

(65) Prior Publication Data
US 2010/0133897 A1    Jun. 3, 2010

(30) Foreign Application Priority Data
Mar. 5, 2007   (DE) .......................... 10 2007 010 513

(51) Int. Cl.
*B60T 13/66*   (2006.01)
*B60T 7/04*    (2006.01)
*B60T 17/22*   (2006.01)

(52) U.S. Cl.
USPC ....................................... 303/155; 303/113.4

(58) Field of Classification Search
USPC .................. 303/115, 113.4; 74/512; 60/533; 92/163, 84
See application file for complete search history.

(56) References Cited

U.S. PATENT DOCUMENTS

| | | | |
|---|---|---|---|
| 3,667,789 A * | 6/1972 | McNeely et al. | 403/128 |
| 6,253,635 B1 | 7/2001 | Huber | |
| 6,471,304 B1 | 10/2002 | Deml et al. | |
| 6,953,228 B2 | 10/2005 | Leske et al. | |
| 7,063,200 B2 * | 6/2006 | Takahashi | 192/109 F |
| 2005/0067891 A1 | 3/2005 | Ogiwara et al. | |
| 2006/0266032 A1 * | 11/2006 | Welter et al. | 60/533 |
| 2008/0196983 A1 | 8/2008 | Von Hayn et al. | |

FOREIGN PATENT DOCUMENTS

| | | |
|---|---|---|
| DE | 197 41 366 C1 | 4/1999 |
| DE | 10 2004 011 622 A1 | 3/2005 |
| DE | 10 2004 042 083 A1 | 4/2005 |
| EP | 1 369 329 A1 | 12/2003 |
| WO | WO 98/46461 | 10/1998 |
| WO | WO 2006/084864 | 8/2006 |

OTHER PUBLICATIONS

WO 2006/084864 A1, machine translation from Espacenet.*
WO 2006/084864 A1, machine translation from Espacenet, retrieved Mar. 11, 2012.*

* cited by examiner

*Primary Examiner* — Anna Momper
(74) *Attorney, Agent, or Firm* — RatnerPrestia

(57) ABSTRACT

In order to increase the operational safety of a device which is used in a brake system of the "brake-by-wire" type and has the purpose of activating and deactivating a pedal travel simulator, an articulated connection which permits an all around pivoting movement of a piston rod is provided between a piston and the piston rod which activates the latter.

11 Claims, 2 Drawing Sheets

ACTUATING UNIT FOR A MOTOR VEHICLE BRAKE SYSTEM

CROSS REFERENCE TO RELATED APPLICATIONS

Figure 1:
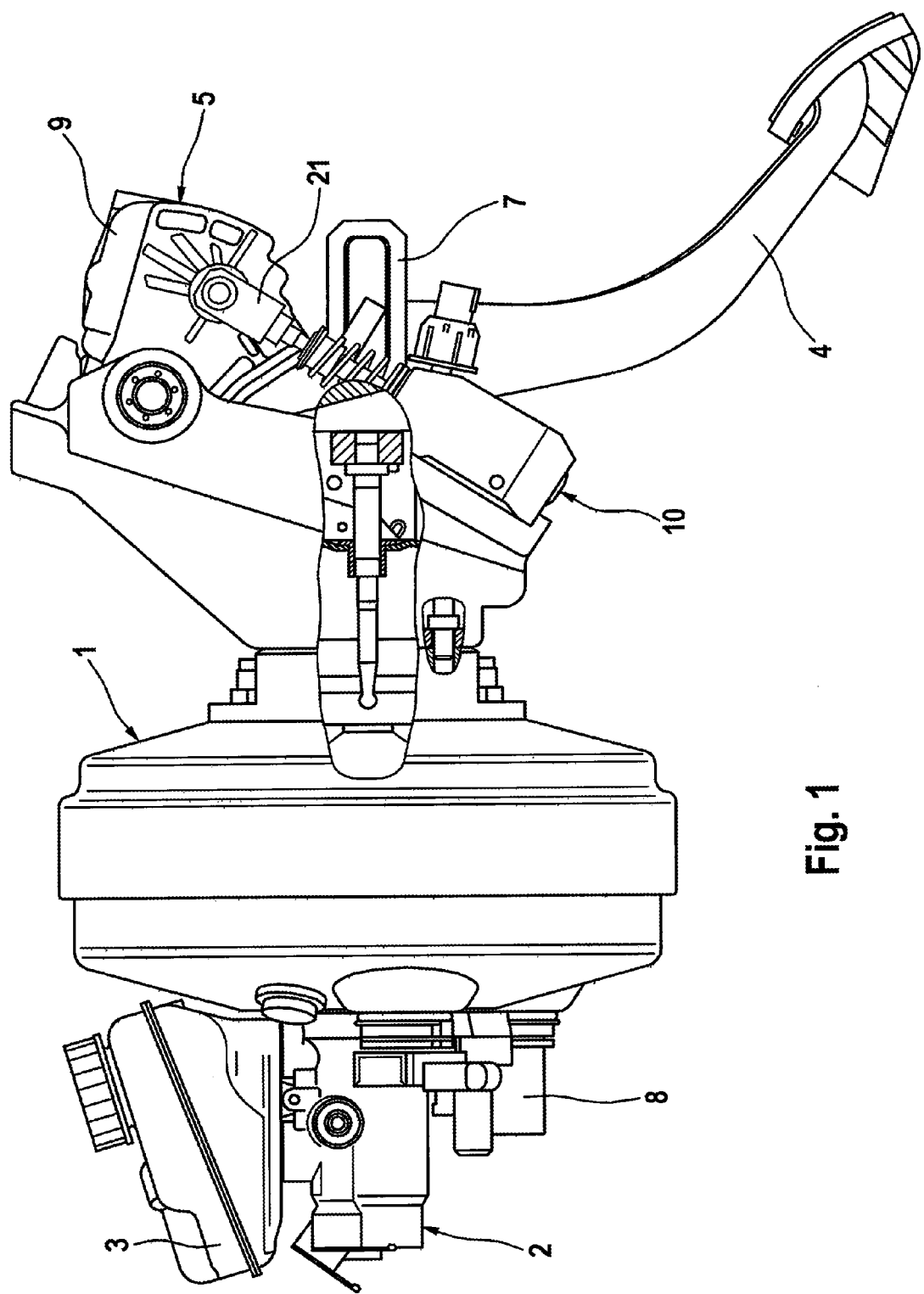

This application is the U.S. national phase application of PCT International Application No. PCT/EP2007/055046, filed May 24, 2007, which claims priority to German Patent Application No. DE 10 2007 010 513.6, filed Mar. 5, 2007, the contents of such applications being incorporated by reference herein.

BACKGROUND OF THE INVENTION

1. Field of the Invention

The invention relates to an activation unit for a motor vehicle brake system of the "brake-by-wire" type, which has:
  a) a brake booster which can be activated either by means of an input element which can be brought into a force-transmitting connection with a brake pedal or as a function of a driver's request or independently of the driver's will by means of an electronic control unit, with means which permit decoupling of a force-transmitting connection between the brake pedal and brake booster in the "brake-by-wire" operating mode being provided between the brake pedal and the brake booster,
  b) a master brake cylinder which is connected downstream of the brake booster,
  c) means for sensing a driver's request or the activation travel of the brake pedal,
  d) a pedal travel simulator which interacts with the brake pedal and by means of which a restoring force which acts on the brake pedal In the "brake-by-wire" operating mode can be simulated independently of activation of the brake booster, and
  e) a hydraulic activation and deactivation device which activates the pedal travel simulator in the "brake-by-wire" operating mode and deactivates it outside the "brake-by-wire" operating mode, and which is formed by a cylinder-piston arrangement whose pressure space is connected by means of a disconnectable connection to a pressure medium volume accommodating element and on whose piston a simulator housing is supported.

2. Description of the Related Art

Such an activation unit is known, for example, from the applicant's international patent application WO 2006/084864 A1. The support of the abovementioned simulator housing on the activation and deactivation device is provided in the abovementioned activation unit by means of a piston rod via which the movement of the brake pedal or of the simulator housing is transmitted to the piston outside the "brake-by-wire" operating mode. The piston rod is rigidly connected to the piston and guided by it. The piston has, at its end facing away from the pressure space, an annular face which, in the unactivated position of the arrangement, bears against a metallic stop ring. However, it is felt to be disadvantageous that when the brake pedal is released suddenly high acceleration values occur at the stop, and said high acceleration values may cause undesired play between the piston rod and the piston of the cylinder-piston arrangement.

SUMMARY OF THE INVENTION

An object of the present invention is therefore to propose suitable measures which permit effective disconnection of the piston rod from the piston while maintaining satisfactory functioning.

This object is achieved according to aspects of the invention in that a connection whose degree of freedom=3 is provided between the piston and the piston rod.

In order to concretize the inventive idea, in one advantageous development of the subject matter of the invention the connection between the piston and the piston rod is embodied as an articulated connection in which the piston rod has a spherical articulation head, and the piston is provided with a correspondingly formed head receptacle.

In the description below, the activation unit according to aspects of the invention will be explained in more detail with reference to the appended drawing, in which:

BRIEF DESCRIPTION OF THE PREFERRED EMBODIMENTS

Figure 2:
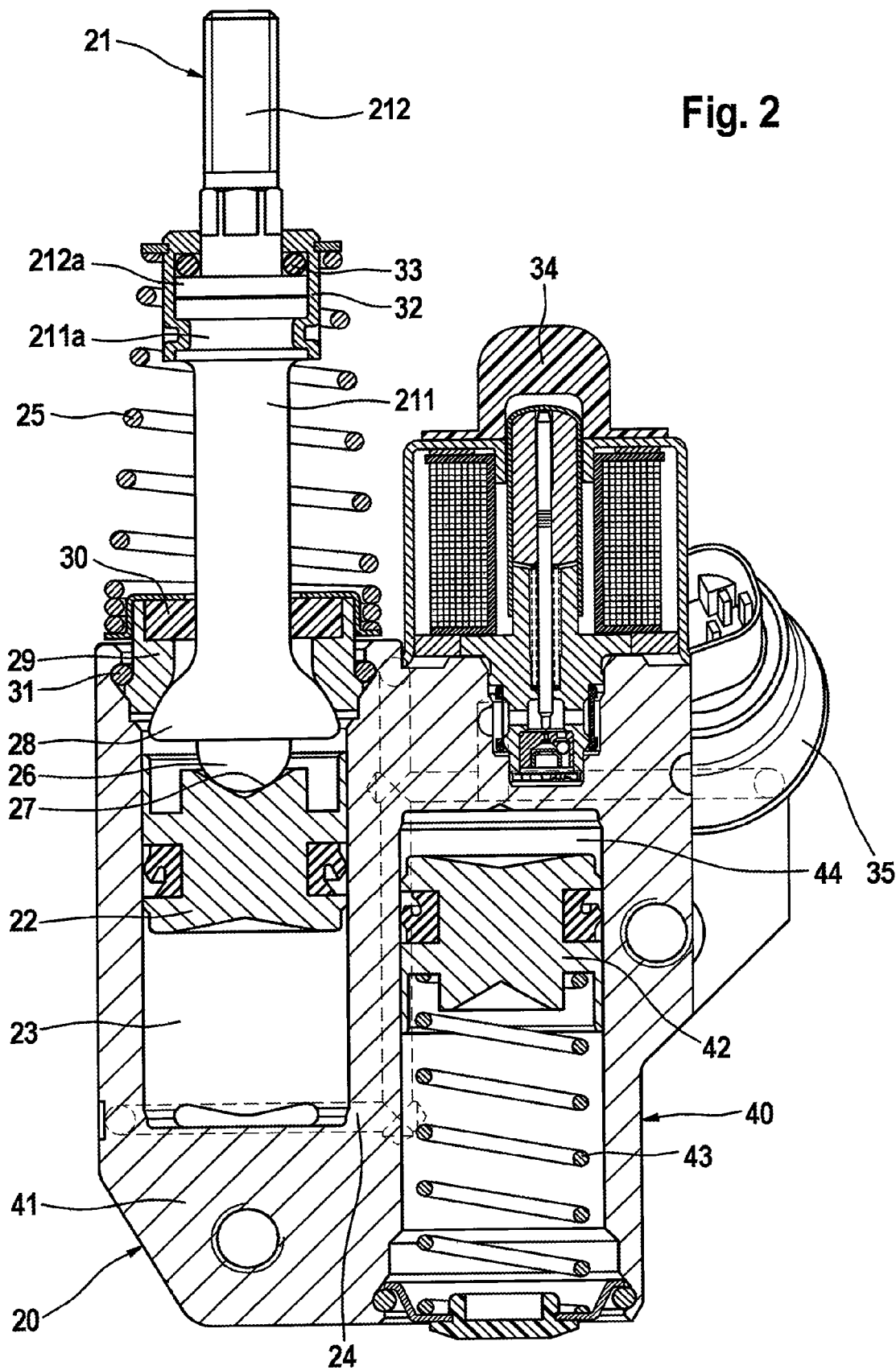

FIG. 1 shows an inventive activation unit of a motor vehicle brake system of the "brake-by-wire" type in a three-dimensional illustration; and FIG. 2 shows a sectional illustration of the activation and deactivation device which is used in the activation unit shown in FIG. 1 and is assigned to the pedal travel simulator.

DETAILED DESCRIPTION OF THE PREFERRED EMBODIMENTS

The activation unit illustrated in FIG. 1 is composed of a brake booster, preferably an underpressure brake booster 1, a master brake cylinder, preferably a tandem master cylinder 2, which is connected downstream of the brake booster 1 and to whose pressure spaces (not illustrated) wheel brakes of the motor vehicle are connected, with the intermediate connection of a hydraulic open-loop and closed-control unit (not illustrated either), and a pressure medium reservoir vessel 3 which is assigned to the master brake cylinder 2. A brake pedal 4 is used by the driver to activate the brake booster 1, with a pedal travel simulator 5 (only indicated), which interacts with the brake pedal 4, in particular in the "brake-by-wire" operating mode and which conveys the usual brake pedal sensation to the driver, being provided. A driver's deceleration request or the activation travel of the brake pedal 4 is sensed by means of at least one sensor device whose signals are fed to an electronic control unit (not shown). The output signals of the electronic control unit can be used to activate, inter alia, an electromagnet which is assigned to the brake booster 1 and which permits a pneumatic control valve to be activated independently of the driver's will, said control valve controlling the supply of air to the brake booster 1. The control valve is activated by the driver by means of an input element 7 which is connected to the brake pedal 4 in a force-transmitting fashion. The coupling of the brake pedal 4 to the input element 7 is preferably embodied in such a way that decoupling of the force-transmitting connection between the brake pedal 4 and the Input element 7 is ensured in the "brake-by-wire" operating mode. A travel sensor is used to sense the travel of a movable wall, which applies the boosting force of the brake booster 1, or the travel of an output element of the brake booster 1 which transmits its output force to a first piston (not illustrated) of the master brake cylinder 2.

The pedal travel simulator 5, which is located outside the force flux between the brake pedal 4 and the brake booster 1 in the exemplary embodiment shown and by which, as already mentioned, a resetting force which acts on the brake pedal 4 can be simulated independently of activation of the brake booster 1 in the "brake-by-wire" operating mode, is embodied in such a way that an activation and deactivation device 10 (only indicated schematically in FIG. 1) can be used to activate said pedal travel simulator 5 when the force-transmitting connection between the brake pedal 4 and the brake booster 1 is decoupled in the "brake-by-wire" operating mode, and to deactivate said pedal travel simulator 5 outside the "brake-by-wire" operating mode. A simulator housing 9 is supported on the activation and deactivation device 10 via a piston rod 21.

As is apparent, in particular, from FIG. 2, the activation and deactivation device 10 is formed essentially by a piston-cylinder arrangement 20 and a hydraulic pressure medium accommodating element 40, which are arranged in a housing 41. The housing 41 is supported on a pedal block (not illustrated). The piston 22 of the piston-cylinder arrangement 20, which is connected in a force-transmitting fashion to the simulator housing 9 by means of the activation rod 21 mentioned in conjunction with FIG. 1, bounds a pressure space 23 which is connected, by means of a hydraulic connection 24 illustrated by dashed lines, to the pressure medium accommodating element 40 which, in the example shown, is embodied as a low pressure accumulator with a piston 42 which is prestressed by means of a spring 43. The low pressure accumulator 40 is preferably configured here in such a way that it has a pressure medium reserve volume 44 for compensating changes in temperature or leaks. The two pistons 22, 42 are preferably of identical design here in terms of geometry and material despite their differing functions. A check valve 34, which can be activated electromagnetically and which permits the abovementioned connection 24 to be shut off, is inserted into the hydraulic connection 24. The hydraulic pressure in the pressure space 23 of the piston-cylinder arrangement 20 can be determined by means of a pressure sensor 35.

As is also apparent in FIG. 2, the piston rod 21 is embodied in two parts and is composed of a first piston rod part 211, which is assigned to the piston 22 of the cylinder-piston arrangement 20, and of a second piston rod part 212, which is coupled to the previously mentioned simulator housing 9. The piston rod parts 211, 212 have, at their ends lying opposite one another, sections 211a, 212a with a relatively large diameter, with an annular face, turned away from the first section 211a, of the second section 212a bearing against a damping element 33. The damping element 33, which is composed of suitable elastic material in the illustrated embodiment by means of an O ring, is accommodated by a pot shaped securing part 32 which is attached to the first piston rod part 211 or its section 211a with a relatively large diameter by means of a positively locking connection. This connection can be implemented, for example, by shearing the securing part 32.

In order to permit an all round pivoting movement of the piston rod 21, which movement is necessary for the activation process and for compensating tolerances, the piston rod part 211 has, at its end turned toward the piston 22, a spherical articulation head 26 which interacts with a head receptacle 27, correspondingly formed on the piston 22, or forms an articulated connection with said head receptacle 27. The articulation head 26 is adjoined in the axial direction by a ball segment shaped section 28, with the articulation head 26 and the section 28 having a common center point. In the unactivated position of the cylinder-piston arrangement 20, the ball segment shaped section 28 bears against a correspondingly shaped stop element 29 with prestress of a spring 25. The stop element 29, which is secured in the housing of the cylinder-piston arrangement 20 by means of a wire closure 31, accommodates a stripping element 30 which protects the running surface of the piston 22 against soiling.

The function of the activation unit described is known from patent application WO 2006/084864 A1 described at the beginning, so that it is not necessary to describe it.

The invention claimed is:

1. An activation unit of a brake-by-wire system for a motor vehicle, having:
    a) a brake booster which is configured to be activated either by a brake pedal or as a function of a driver's request or independently of the driver by an electronic control unit, with a mechanism to permit decoupling of a force-transmitting connection between the brake pedal and brake booster in a "brake-by-wire" operating mode being provided between the brake pedal and the brake booster,
    b) a master brake cylinder which is connected downstream of the brake booster,
    c) means for sensing a driver's request or an activation travel of the brake pedal,
    d) a pedal travel simulator which interacts with the brake pedal and by means of which a restoring force which acts on the brake pedal in the "brake-by-wire" operating mode can be simulated independently of activation of the brake booster, and
    e) a hydraulic activation and deactivation device which activates the pedal travel simulator in the "brake-by-wire" operating mode and deactivates the pedal travel simulator outside of the "brake-by-wire" operating mode, and which is formed by a cylinder-piston arrangement whose pressure space is connected by a disconnectable connection to a pressure medium volume accommodating element and on whose piston a simulator housing is supported via a piston rod, wherein a connection having three degrees of freedom is provided between the piston and the piston rod,
    wherein the connection between the piston and the piston rod is embodied as an articulated connection in which the piston rod has a spherical articulation head, and the piston is provided with a correspondingly formed head receptacle,
    wherein the piston rod has a ball segment shaped section that is separate from the spherical articulation head which, in the unactivated position of the cylinder-piston arrangement, bears against a correspondingly shaped stop element that is separate from the piston,
    wherein in an activated position of the cylinder-piston arrangement, the spherical articulation head is separated from the correspondingly shaped stop element.

2. The activation unit as claimed in claim 1, wherein the spherical articulation head and the ball segment shaped section have the same center point.

3. The activation unit as claimed in claim 1, wherein the stop element accommodates a stripping element for protecting a running surface of the piston against soiling.

4. The activation unit as claimed in claim 1, wherein the stop element is protected by a wire closure.

5. The activation unit as claimed in claim 1, wherein the piston rod is embodied in two parts and is composed of a first piston rod part, which is assigned to the piston, and of a second piston rod part, which is assigned to the simulator housing and interacts with a damping element which is attached to the first piston rod part.

6. The activation unit as claimed in claim 5, wherein the first piston rod part and the second piston rod part each have sections which bear one against the other and have an enlarged diameter portion, wherein a pot shaped securing part, which accommodates the damping element, is attached to the section with an enlarged diameter portion of the first piston rod part.

7. The activation unit as claimed in claim 1, wherein the pressure medium volume accommodating element is embodied as a low pressure accumulator whose piston is of substantially identical design to the piston of the cylinder-piston arrangement.

8. The activation unit as claimed in claim 7, wherein the low pressure accumulator is configured such that it has a pressure medium reserve volume for compensating changes in temperature or leaks.

9. The activation unit as claimed in claim 1 further comprising a pressure sensor for sensing a pressure in the pressure space of the cylinder-piston arrangement.

10. The activation unit as claimed in claim 1, wherein a spring, which is arranged coaxially with respect to the piston rod and serves to reset the simulator housing or the brake pedal, is supported on the stop element.

11. The activation unit as claimed in claim 1, wherein the stop element is disconnected from the piston.

* * * * *

UNITED STATES PATENT AND TRADEMARK OFFICE
CERTIFICATE OF CORRECTION

PATENT NO.        : 8,500,222 B2
APPLICATION NO. : 12/527732
DATED             : August 6, 2013
INVENTOR(S)       : Schonlau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 663 days.

Signed and Sealed this

Fifteenth Day of September, 2015

Michelle K. Lee
*Director of the United States Patent and Trademark Office*